United States Patent
Nandwani et al.

(10) Patent No.: US 8,720,253 B2
(45) Date of Patent: May 13, 2014

(54) RECONFIGURABLE LEAK TESTING SYSTEM

(75) Inventors: Sunil Nandwani, Troy, MI (US); Brian Holmes, Petersburg, MI (US); Daniel C Gulledge, Novi, MI (US); Michael P. Miller, Plymouth, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 465 days.

(21) Appl. No.: 13/195,517

(22) Filed: Aug. 1, 2011

(65) Prior Publication Data

US 2013/0031961 A1    Feb. 7, 2013

(51) Int. Cl.
*G01M 3/04* (2006.01)

(52) U.S. Cl.
USPC .......................................................... 73/40

(58) Field of Classification Search
USPC .......................................................... 73/40
See application file for complete search history.

(56) References Cited

U.S. PATENT DOCUMENTS

| | | | |
|---|---|---|---|
| RE26,657 E * | 9/1969 | Fitzpatrick et al. | 73/40 |
| RE26,661 E * | 9/1969 | Fitzpatrick et al. | 73/40 |
| 4,813,268 A * | 3/1989 | Helvey | 73/40.7 |
| 5,850,036 A * | 12/1998 | Giromini et al. | 73/40 |
| 6,330,822 B1 * | 12/2001 | Hawk et al. | 73/40.7 |
| 6,578,407 B1 * | 6/2003 | McTaggart | 73/40 |
| 6,666,970 B1 * | 12/2003 | Jornitz et al. | 210/650 |
| 6,966,216 B2 * | 11/2005 | Hotta | 73/49.3 |
| 2005/0160794 A1 * | 7/2005 | Sonntag et al. | 73/40 |

FOREIGN PATENT DOCUMENTS

| | | |
|---|---|---|
| DE | 2802645 A1 | 7/1979 |
| DE | 102004028875 A1 | 1/2006 |
| DE | 102006035943 A1 | 2/2008 |

* cited by examiner

*Primary Examiner* — Hezron E Williams
*Assistant Examiner* — Rodney T Frank
(74) *Attorney, Agent, or Firm* — Quinn Law Group, PLLC (57) ABSTRACT

A reconfigurable leak testing system includes a leak testing station, an off-shuttle disposed adjacent to the leak testing station, and a fixture cartridge that is translatable between the off-shuttle and the leak testing station. The fixture cartridge is configured to selectively couple with the leak testing station and includes an upper fixture, a lower fixture, and a plurality of actuatable testing features. The fixture cartridge is configured to receive a part between the upper fixture and lower fixture, and the plurality of actuatable testing features are configured to contact the received part to create a closed volume adjacent the part, wherein the closed volume may be pressurized via a pressurized fluid, and examined for leaks.

20 Claims, 6 Drawing Sheets

RECONFIGURABLE LEAK TESTING SYSTEM

TECHNICAL FIELD

The present invention relates to automated leak testing machines that may be particularly suited for leak testing metal castings.

BACKGROUND

Casting is a metal forming technique that involves pouring molten metal into a hollow cavity of a mold, where the cavity is the negative of the desired part shape. As the molten metal cools in the cavity, it solidifies and may then be separated from the mold as a solid part. The casting process may be used to form relatively complex metal parts that may be uneconomical to produce by other methods. In particular, many complex automotive components, such as transmission cases and motor housings, may be fabricated through a casting process.

During the casting process, air bubbles in the molten metal, defects in the mold, and/or excessive shrinkage during cooling may create pits or other surface flaws in the final part. If these flaws occur in a sufficiently thin region of a shell-like component used to contain a fluid, they may result in micro-leaks through the body of the casting. It has been found that a pore/hole as small as 8 µm may allow oil to leak out of a cast transmission case. Therefore, cast parts may be quality inspected and/or leak checked following the casting process to ensure that no micro-leaks/pores exist.

In an automated production line, flexibility and reconfigurability are desirable qualities. Rapid station reconfiguration may enable a production line to produce one part/component during a first shift, and an entirely different part/component in a second shift. Likewise, flexibility may allow for limited production runs using common capital equipment, which may reduce the overall expense associated with each respective part design.

SUMMARY

A reconfigurable leak testing system includes a leak testing station, an off-shuttle disposed adjacent to the leak testing station, and a fixture cartridge that is translatable between the off-shuttle and the leak testing station. The fixture cartridge may be configured to selectively couple with the leak testing station and may include an upper fixture, a lower fixture, and a plurality of actuatable testing features. The fixture cartridge may be configured to receive a part between the upper fixture and lower fixture, and the plurality of actuatable testing features may be configured to contact the received part to create a closed volume adjacent the part. The plurality of actuatable testing features may include, for example, an extendable seal or extendable clamp. The system may further include an automated conveyor system that may controllably translate the fixture cartridge between the off-shuttle and the leak testing station.

The leak testing station may include an actuator, and a fixture interface coupled with the actuator, the fixture interface including a plurality of interlocks configured to selectively couple with the upper fixture of the fixture cartridge. Additionally, the actuator may be configured to selectively raise and lower the fixture interface and the upper fixture if connected via the interlocks.

The fixture interface may further include a connection panel configured to couple with the upper fixture, the connection panel may include both an electrical connector and a fluid connector, wherein the electrical connector provides an electrical connection between the leak testing station and the fixture cartridge, and the fluid connector provides a pneumatic or hydraulic fluid connection between the leak testing station and the fixture cartridge.

The system may include a controller configured to control the actuation of the plurality of testing features. The controller may further be configured to pressurize the closed volume by providing a pressurized fluid to the volume.

To detect a leak, the controller may monitor the pressure of the pressurized volume and detecting any pressure deviations from an expected pressure. Alternatively, the controller may monitor the total mass-flow of the pressurized fluid provided to the volume, and compare the monitored mass-flow to an expected total mass-flow.

Additionally, a method of leak testing a part may include selecting a fixture cartridge to receive the part, where the fixture cartridge includes a separable upper fixture and lower fixture; loading the fixture cartridge into a leak testing station; receiving the part between the upper and lower fixtures; establishing a closed volume on one side of the part; pressurizing the closed volume using a pressurized fluid; and monitoring the pressurized fluid to detect fluid leakage.

The step of loading the fixture cartridge into the leak testing station may include translating the fixture cartridge from an off-shuttle to the leak testing station followed by coupling a fixture interface of the leak testing station to the upper fixture of the fixture cartridge. The fixture interface may be coupled to the upper fixture, for example, by selectively coupling a plurality of interlocks on the fixture interface to respective connection elements on the upper fixture. The method may further include testing for the existence of a fluid leak between the fixture interface and the upper fixture once the fixture interface is coupled to the upper fixture.

The fixture cartridge may be translated from an off-shuttle to the leak testing station by controllably translating the fixture cartridge using an automatic conveyor system at the direction of a controller. The part may be received between the upper and lower fixtures by separating the upper fixture from the lower fixture, and receiving the part on the lower fixture.

Establishing a closed volume on one side of the part may include clamping the part to the lower fixture, and sealing an opening in the part. In an embodiment, the opening may be sealed by contacting the part with a selectively extendable plunger disposed on the upper fixture.

Monitoring the pressurized fluid to detect fluid leakage may be performed by comparing a sensed parameter of the monitored pressurized fluid to an expected parameter. For example, a controller may monitor the pressure of the pressurized volume; compare the monitored pressure to an expected pressure; and indicate fluid leakage if the monitored pressure deviates from the expected pressure. Alternatively, a controller may monitor the total mass-flow of the pressurized fluid into the closed volume; compare the monitored total mass-flow to an expected total mass-flow; and indicate fluid leakage if the monitored total mass-flow deviates from the expected total mass-flow The above features and advantages and other features and advantages of the present invention are readily apparent from the following detailed description of the best modes for carrying out the invention when taken in connection with the accompanying drawings.

DETAILED DESCRIPTION

Figure 1:
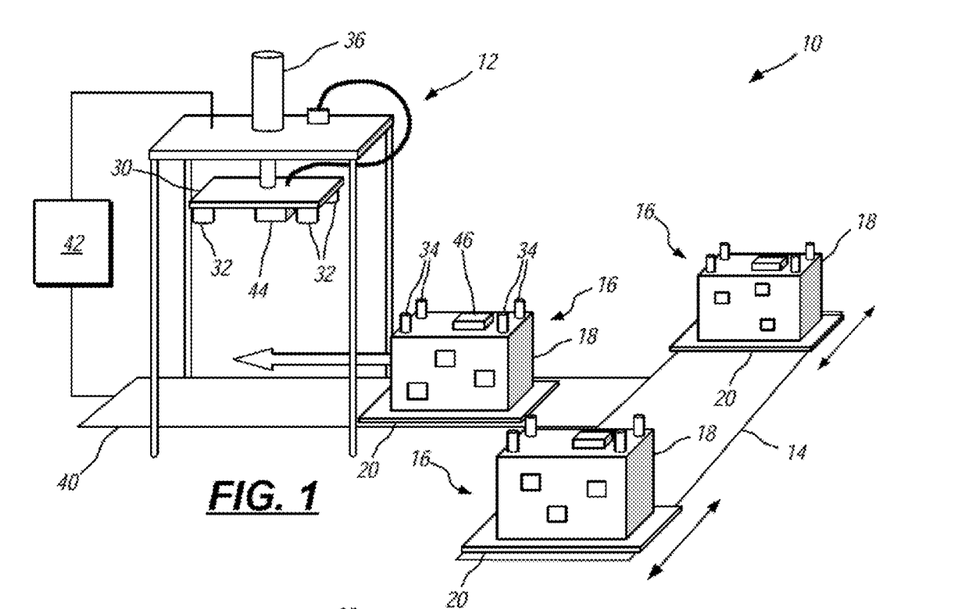
FIG. 1 is a schematic perspective view of a reconfigurable leak test system receiving a testing fixture cartridge.

Referring to the drawings, wherein like reference numerals are used to identify like or identical components in the various views, FIG. 1 schematically illustrates an automatically reconfigurable, leak testing system 10 that includes a leak testing station 12, an off-shuttle 14, and one or more leak testing, fixture cartridges 16. Each fixture cartridge 16 may include a respective upper fixture 18 and lower fixture 20, which may separate to accept a part 22 for leak testing. Furthermore, each fixture cartridge 16 may be independently translatable along the off-shuttle 14.

Figure 2:
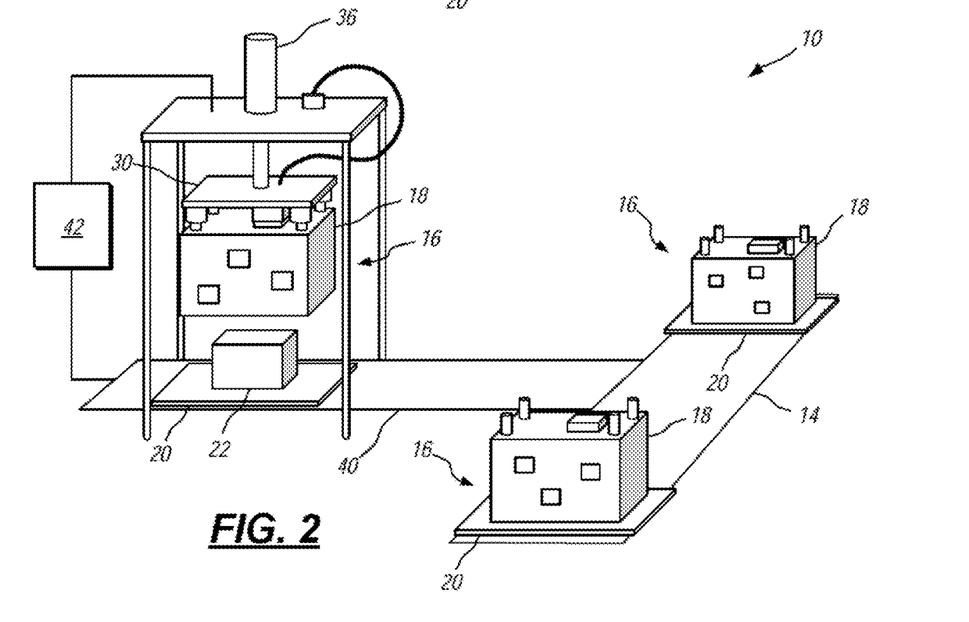
FIG. 2 is a schematic perspective view of a reconfigurable leak test system engaged with a testing fixture cartridge.

As generally shown in FIGS. 1 and 2, the leak testing station 12 may be configured to receive a fixture cartridge 16, and may selectively engage with the upper fixture 18 using a fixture interface 30. The fixture interface 30 may include one or more mechanical or electromechanical interlocks 32, which may each selectively engage with a respective connection element 34 disposed on the upper fixture 18. In one embodiment, the interlocks 32 may include one or more mechanical latches that may engage one or more holes provided in the connection elements 34. In another embodiment, the connection elements 34 may be cylindrical posts with one or more protrusions or other connection features that may be engaged by the interlocks 32 to provide a quick-disconnect-type engagement. In still another embodiment, the interlocks 32 may include an electromagnetic actuator that may magnetically engage ferrous portions of the connection elements 34. As may be appreciated, other methods of actuated interconnection may similarly be used.

The leak testing station 12 may include an actuator 36 that may be configured to raise and lower the fixture interface 30. The actuator 36 may include a hydraulic actuator, servomotor, or other means of linear actuation. When the interlocks 32 are rigidly coupled with the upper fixture 18, the hydraulic actuator 36 may correspondingly raise and/or lower the upper fixture 18 relative to the lower fixture 20.

The leak testing station 12 may receive a fixture cartridge 16 from the off-shuttle 14 in an automated manner, such as though an automated conveyor system 40. The automated conveyor system 40 may include, for example, a conveyor belt or other active drive mechanism that may controllably translate a fixture cartridge 16 between the off-shuttle 14 and the leak testing station 12. Prior to a test, the automated conveyor system 40 may advance one respective cartridge 16 to a location within the leak testing station 12 and position it where the interface 30 may couple with the upper fixture 18 (e.g., using the interlocks 32). Additionally, the off-shuttle 14 may employ a similar automated conveyor system 40 to translate fixture cartridges 16 along the off-shuttle 14. It should be appreciated that the automated conveyor system 40 may employ any similar material handling or part delivery technologies that may controllably maneuver and/or translate a fixture cartridge 16 from the off-shuttle 14 to the leak testing station 12.

A controller 42 may oversee and/or directly control the operation of both the leak testing station 12 and the automated conveyor system 40 throughout the fixture selection process and part testing routine. The controller 42 may be embodied, as a server or a host machine, i.e., one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffering electronics.

While shown as a single device in FIGS. 1-2 for simplicity and clarity, the various elements of the controller 42 may be distributed over as many different hardware and software components as are required to optimally control the operation of the system 10. The individual control routines/systems resident in the controller 42 or readily accessible thereby may be stored in ROM or other suitable tangible memory location and/or memory device, and automatically executed by associated hardware components of the controller 42 to provide the respective control functionality. In an embodiment, the controller 42 may include and/or be configured to interface with one or more programmable logic controllers, which are traditionally used to control automated assembly lines.

Figure 3:
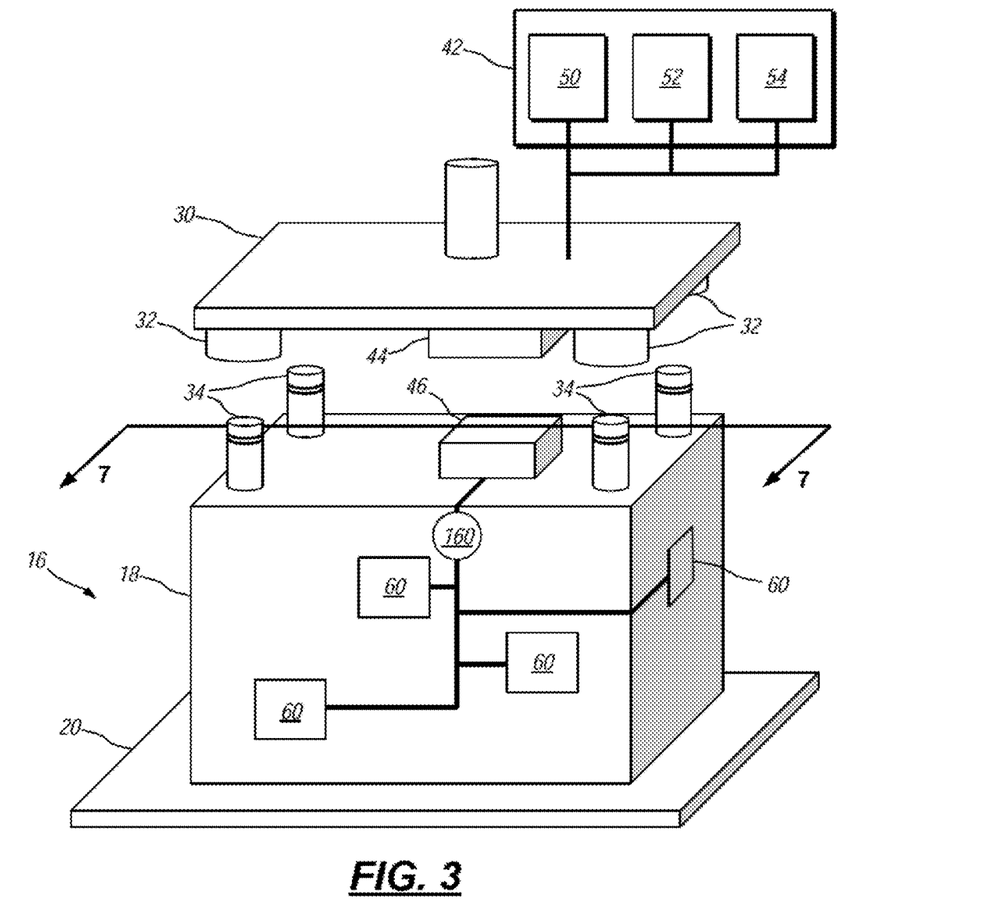
FIG. 3 is a schematic perspective view of an embodiment of a leak testing fixture cartridge.

FIG. 3 provides additional schematic detail regarding to the fixture cartridge 16, the fixture interface 30 and the controller 42. As illustrated, the controller 42 may include an electronic control module 50, a pneumatic control module 52 and a hydraulic control module 54. Each control module 50, 52, 54 may manage one or more working aspects of various testing features 60 included with the fixture cartridge 16. As will be discussed in more detail below, the testing features 60 may include extendable seals, pressure transducers, clamps, and or other devices that may be specifically designed and/or positioned on the fixture cartridge 16 to interface with, and leak test a part 22.

The electronic control module 50 of the controller 42 may include, for example, low-voltage I/O circuitry that may be configured to control the operation of each respective testing feature 60. Additionally, the electronic control module 50 may monitor the real-time status of each testing feature 60 to ensure proper and complete operation every testing cycle. The electronic control module 50 may include multiple channels of I/O that it may use communicate with the fixture cartridge 16. The channels may be configured to be transmitted in either a parallel or a serial communication manner.

The pneumatic control module 52 may provide a regulated source of pressurized air to any testing feature 60 that may be pneumatically operated. Also, the hydraulic control module 54 may provide a regulated source of pressurized fluid to any testing feature 60 that may be hydraulically operated. The pneumatic control module 52 and/or hydraulic control module 54 may each include one or more selectively actuatable fluid valves that may control flow along respectively coupled fluid lines.

As schematically illustrated in FIGS. 1-3, the fixture interface 30 may include a connection panel 44 that may allow any low-voltage electrical signals, pneumatic air, and/or hydraulic fluid to be provided from the controller 42 to the upper fixture 18. As generally illustrated in FIG. 2, when the fixture interface 30 engages the upper fixture 18, the connection panel 44 of the interface 30 (i.e., the upper connection panel 44) may connect with a mating connection panel 46 disposed on the upper fixture 18 (i.e., the lower connection panel 46). Distinct electrical connections may be made between the panels 44, 46 for example, using standard plugable electrical connectors, or other spring-based contact interfaces. Similarly, pneumatic and/or hydraulic connections may be made using one or more fluid couplings that may include any needed seals, o-rings, gaskets, and/or precision manufactured contact surfaces to discourage fluid leaks at the site of the connection. While the connection panel 44 in FIGS. 1-3 is illustrated as a single connector block, it should be understood that multiple connector panels 44 may similarly be provided at various locations across the interface 30.

Figure 4:
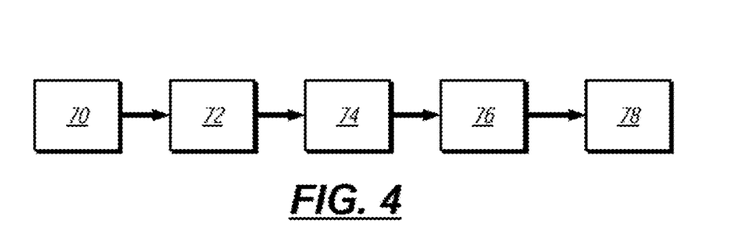
FIG. 4 is a flow diagram representing a method of leak testing a part using a reconfigurable leak testing system.

As generally illustrated by the flow chart provided in FIG. 4, and graphically in FIGS. 5-7C the present system 10 may be configured to leak test a thin-walled part by first selecting the appropriate fixture cartridge 16 to accommodate the part, and then loading the cartridge into the leak testing station 12 (step 70). Once the cartridge 16 is loaded/engaged with the station 12, a part 22 may be received between the upper and lower fixtures 18, 20 (step 72), after which a closed volume may be established on one side of the part, where the volume is partially defined by a wall/surface of the part (step 74). As used herein, a "closed" volume is one that is capable of being pressurized and/or maintaining such pressure absent any unintended openings (i.e., all design-intended openings are fluidly sealed by proper fixturing). The volume may then be pressurized using a fluid, such as air (step 76), while the pressure is monitored to detect fluid leakage (step 78). If a hole exits in the structure of the part, it is expected that the volume will not maintain a constant pressure.

Beginning at step 70, knowledge of the design configuration of the part-to-be-tested may allow the controller 42 to select and shuttle a suitably configured fixture cartridge 16 to within the leak testing station 12. In the manner described above, the station 12 may couple with the upper fixture 18 via the fixture interface 30 and lift the upper fixture 18 away from the lower fixture 20 using the hydraulic actuator 36. Examples of different fixture/part configurations are discussed below with respect to FIGS. 7A-7C.

Figure 5:
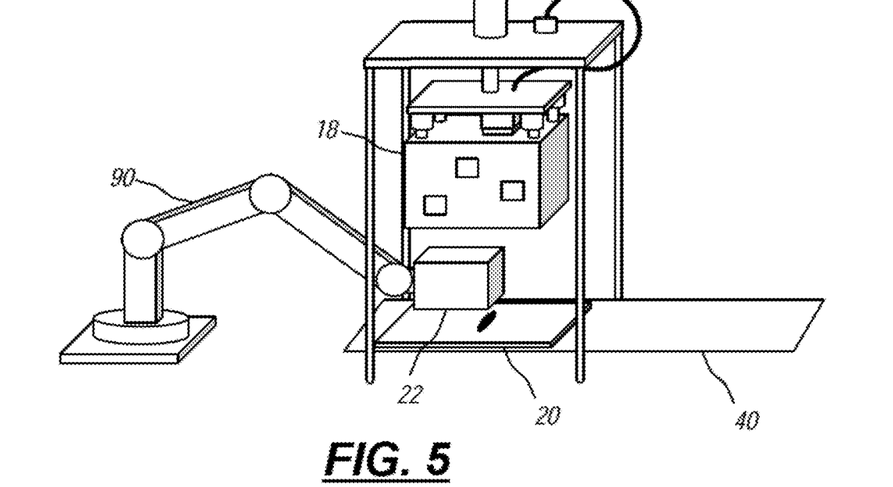
FIG. 5 is a schematic perspective view of a reconfigurable leak test system receiving a casting from a robotic arm.
Figure 6:
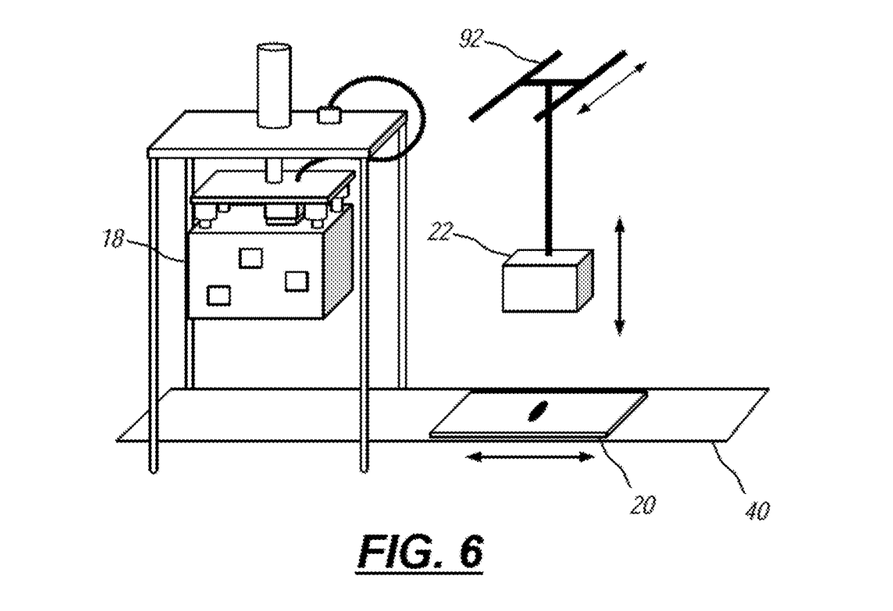
FIG. 6 is a schematic perspective view of a reconfigurable leak test system receiving a casting from an overhead gantry conveyor.

Once the fixture cartridge 16 is loaded into the station 12, it may then receive a part-to-be-tested (step 72). FIGS. 5-6 illustrate two different manners in which a part (shown as a generic part 22) may be received between the upper and lower fixtures 18, 20. As shown in FIG. 5, in one configuration, after the upper fixture 18 is separated from the lower fixture 20, a robotic arm 90 may place the part 22 directly onto the lower fixture 20. In an embodiment, this placement may occur while the lower fixture 20 is still within the station 12. The robotic arm 90 may, for example, obtain the part 22 from an adjacent machining station or part bin, or may pull the part off of an adjacent assembly line. In another configuration, such as shown in FIG. 6, the lower fixture 20 may be configured to translate to a suitable location along the conveyor system 40 to receive the part 22 from an overhead conveyor, carriage, or gantry 92. Once the part 22 is placed on the lower fixture 20, the lower fixture 20 may then translate back to within the station 12. In still another configuration, other conveyor systems or material handling systems known in the art may be used to locate and position the part 22 on the lower fixture 20. Once the part 22 is positioned on the lower fixture 20, and positioned within the station 12, the actuator 36 may lower the upper fixture 18 down onto the part 22 (as generally represented by the schematic cross-sectional views in FIGS. 7A-7C, which are generally taken along line 7-7 from FIG. 3.

Figure 7A:
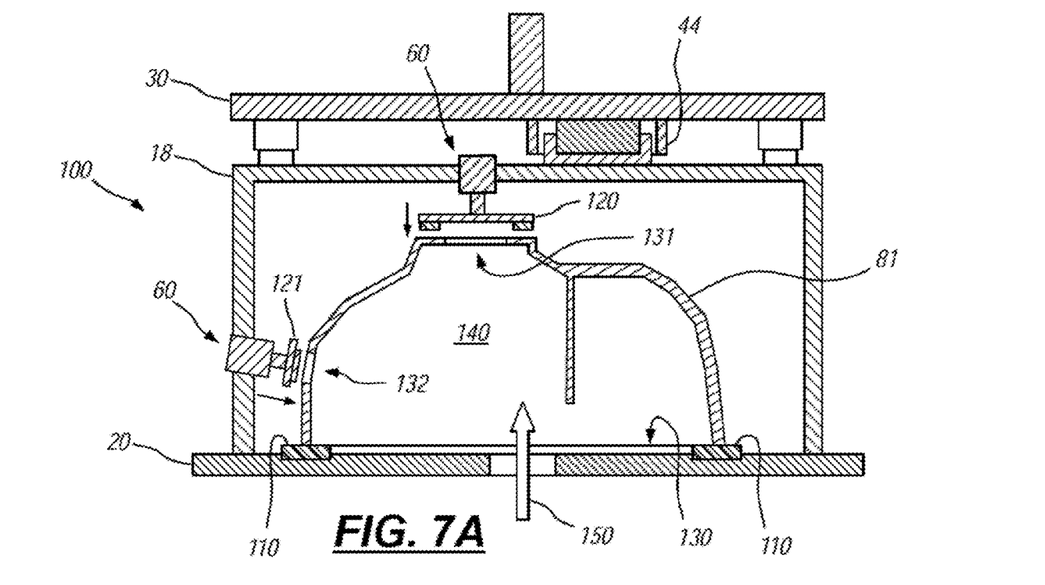
FIG. 7A is a schematic cross-sectional view of a first embodiment of a leak testing fixture cartridge, generally taken along line 7-7 in FIG. 3, performing a leak test on a casting.
Figure 7B:
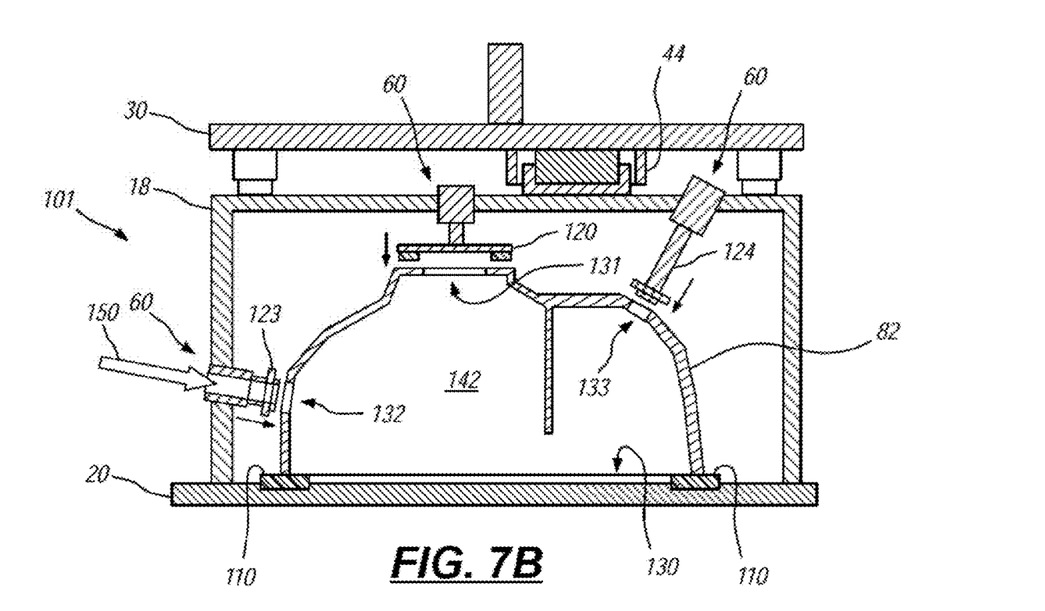
FIG. 7B is a schematic cross-sectional view of a second embodiment of a leak testing fixture cartridge, generally taken along line 7-7 in FIG. 3, performing a leak test on a casting.
Figure 7C:
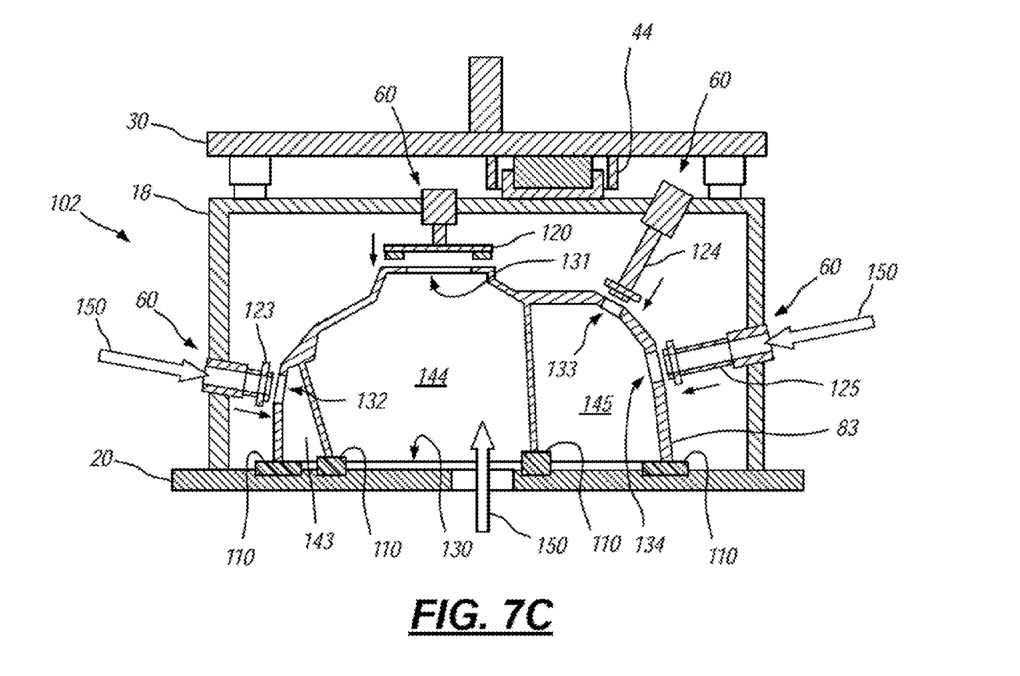
FIG. 7C is a schematic cross-sectional view of a third embodiment of a leak testing fixture cartridge, generally taken along line 7-7 in FIG. 3, performing a leak test on a casting.

As shown in FIGS. 7A-7C, the step of creating a closed volume on one side of the part (step 74) may be performed using the upper and lower fixtures 18, 20, along with testing features 60 that may actively seal various orifices in the part 22. As illustrated, each part design (e.g., parts 81, 82, 83, respectively) may include a unique pattern of holes/orifices that, for example, may ultimately be used to connect hoses, tubes, or other devices/sensors to the respective part. In order to create a closed volume that may be capable of maintaining a pressure (step 74), each design-specified hole must be sealed.

More specifically, FIGS. 7A-7C each illustrate an embodiment of a fixture cartridge 16 (i.e, fixture cartridge 100, 101, 102, respectively) that is respectively designed to seal a slightly different part 22 (i.e., part 81, 82, 83, respectively). In each embodiment, the respective part 81, 82, 83 may seal, in part, against the lower fixture 18 with the aid of an elastomeric seal 110. A hydraulically actuated clamp 120 may apply a controlled compressive force to each part 81, 82, 83, which may urge the part into adequate sealing contact with the seal 110. It should be understood that a pneumatic, mechanical, or electromechanical clamp may likewise be substituted for the hydraulic clamp.

Referring to FIG. 7A, the part 81 may include, for example three distinct openings 130, 131, 132. When sealed, the part 81, along with any sealing mechanisms, may define a volume 140. As described above, opening 130 may be sealed using the lower fixture 18, along with the seal 110. Similarly, the hydraulically actuated clamp 120 may be configured to seal opening 131, which also applying a compressive force against the part 81. Finally, opening 132 may be sealed by a hydraulically actuated plunger 121, which may extend to effectively plug the opening 132. The plunger 121 may include one or more gaskets or o-ring seals to enhance its ability to provide a leak-resistant seal. After the upper fixture 18 is lowered onto the part 81, the clamp 120 and plunger 121 may be actuated (via the controller 42) to advance toward the part 81 until they contact the part 81 with a minimum threshold amount of force to fluidly close volume 140.

FIG. 7B illustrates the sealing of a part 82 that is similar in design to the part 81 provided in FIG. 7A, though which includes a fourth opening 133. As illustrated, the lower fixture 20 may seal opening 130, the clamp 120 may seal opening 131, a first hydraulically actuated plunger 123 may be used to seal opening 132, and a second hydraulically actuated plunger 124 may be used to seal opening 133. Together, the part 82, lower fixture 20, clamp 120, and plungers 123, 124 may define a volume 142.

Finally, FIG. 7C, illustrates an embodiment of the part 83 that includes five distinct openings 130, 131, 132, 133, and 134. In this embodiment, openings 130-133 are sealed in a similar manner as provided in FIG. 7B, while opening 134 is sealed by a third hydraulically actuated plunger 125. Once the clamp 120 and plungers 123, 124, 125 are actuated, three distinct volumes 143, 144, 145 may be defined that may each need to be leak-tested.

While FIGS. 7A-7C generally illustrate three similar manners of creating a closed volume, these techniques are meant to be purely illustrative. It is contemplated that one skilled in the techniques of part fixturing could create similar fixturing arrangements to seal any thin-walled part 22 that is desired to be leak tested. The specific arrangement of plungers, clamps, seals, etc. . . . should not be used to limit the scope of the present invention.

Referring again to FIG. 4, once the fixtures 18, 20 effectively seal the part 22 to create one or more closed volumes, the respectively created one or more closed volumes may be pressurized by a fluid, such as air (step 76). As generally illustrated in FIGS. 7A-7C, this pressurization may occur by supplying pressurized fluid, such as pressurized air 150, in a controlled manner through a fluid supply opening that may be provided in one or more plungers (e.g., plungers 123, 125) and/or provided in the lower fixture 20. For the purpose of creating a "closed volume," as discussed above, the volume should be considered "closed" if there are no design-intended openings in the part except for the one or more fluid supply openings).

Figure 8:
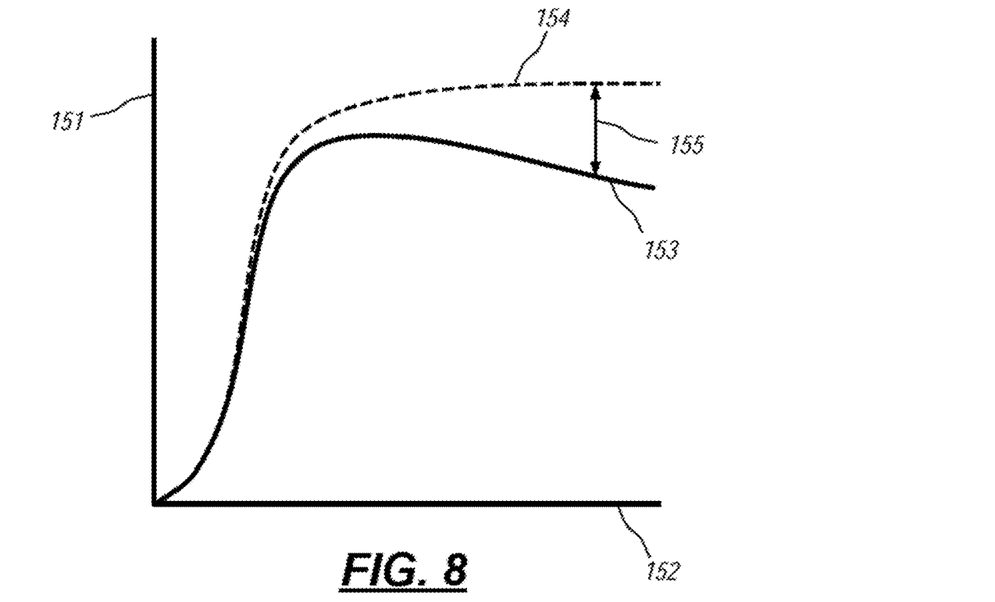
FIG. 8 is a graph comparing an actual monitored volume pressure, in the presence of a fluid leak, to an expected volume pressure if no leak were present.
Figure 9:
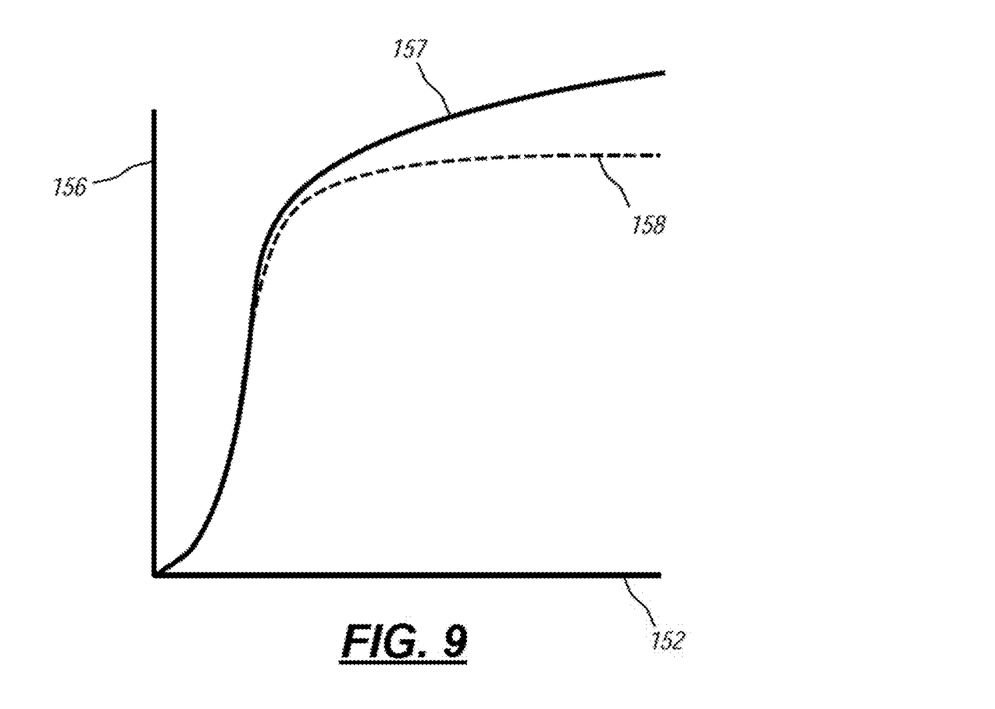
FIG. 9 is a graph comparing an actual monitored total mass-flow of pressurized fluid into the volume, in the presence of a fluid leak, to an expected total mass-flow if no leak were present.

To detect a leak (step 78), the controller 42 may compare a sensed parameter of the pressurized fluid within the closed volume to an expected value of the same parameter. For example, the controller 42 may monitor the actual pressure of the volume, such as through a pressure sensor integrated into a plunger (e.g., plunger 121) or integrated into the lower fixture 20. As generally illustrated in FIG. 8, where the vertical axis represents volume pressure 151 and the horizontal axis represents time 152, the controller 42 may then compare the actually sensed pressure profile 153 with an expected pressure profile 154, given a fixed duration pressurization period. If there is a fall off or deviation 155 in actual pressure 152 (as shown), the controller 42 may indicate that a leak exists. Alternatively, as generally illustrated in FIG. 9, the controller 42 may detect a leak by monitoring the flow of air into the volume using a mass-flow sensor provided between the pneumatic control module 52 and the volume, where the vertical axis represents total mass-flow 156 of air into the volume and the horizontal axis represents time 152. The controller 42 may then compare the actual total mass-flow 157 of air entering the volume with an expected total mass-flow 158. If air 150 is continuously flowing into the volume after it is expected to be fully pressurized, the controller 42 may indicate that a leak exists.

Referring again to FIG. 3, to ensure that any leak (e.g., sensed pressure drop, or continuously increasing mass-air flow) is attributable to the part 22, and not the fluid couplings between the interface 30 and the upper fixture 18, the fluid couplings may be separately leak-tested prior to testing a part 22. The coupling-test may be performed by closing a valve 160 provided on the upper fixture 18 between the lower connection panel 46 and the various testing features 60. A testing routine similar to steps 76 and 78 (above) may then be performed to test the integrity of the fluid couplings provided between the connection panels 44, 46. For example, the various fluid lines extending from the pneumatic and/or hydraulic control modules 52, 54 may be pressurized up to the closed valve 160. The line pressure and/or mass-flow of fluid into the lines may then be monitored at the controller 42 to determine whether any fluid loss at the coupling exists, which may be indicative of a leak. Such a test may be performed during an initialization routine executed after a new cartridge 16 is loaded into the station 12 (i.e., immediately after step 70).

Finally, following completion of the testing routine (i.e., following step 78), each plunger, clamp, or other testing feature 60 engaged with the part 22 may retract (i.e., disengage) from the part and return to a "home" state. This retraction may be separately verified by one or more sensors associated with each feature 60, and communicated to the controller 42 via the electronic control module 50. Once it is verified that all testing features are disengaged from the part 22, the actuator 36 may lift the upper fixture 18 from the lower fixture 20, and the part 22 may be retrieved. Following the part removal, either a new, similar part may be loaded for testing, or the actuator 36 may lower the upper fixture 18 back onto the lower fixture 20, where the entire cartridge 16 may be swapped with a different fixture cartridge 16 on the off-shuttle 14.

While the best modes for carrying out the invention have been described in detail, those familiar with the art to which this invention relates will recognize various alternative designs and embodiments for practicing the invention within the scope of the appended claims. All directional references (e.g., upper, lower, upward, downward, left, right, leftward, rightward, above, below, vertical, and horizontal) are only used for illustrative purposes to aid the reader's understanding of the present invention, and do not create limitations, particularly as to the position, orientation, or use of the invention. It is contemplated that the upper fixture 18 may comprise multiple distinct portions that may each include their own separate actuator 36 and/or fixture interface 30. It is similarly contemplated that the actuators 36 need not lift the upper cartridge 18 in strictly a "vertical" direction. It is intended that all matter contained in the above description or shown in the accompanying drawings shall be interpreted as illustrative only and not as limiting.

The invention claimed is:

1. A reconfigurable leak testing system comprising:
a leak testing station;
an off-shuttle disposed adjacent to the leak testing station; and
a fixture cartridge translatable between the off-shuttle and the leak testing station, the fixture cartridge configured to selectively couple with the leak testing station and including an upper fixture, a lower fixture, and a plurality of actuatable testing features;
wherein the fixture cartridge is configured to receive a part between the upper fixture and lower fixture; and
wherein each of the plurality of actuatable testing features is respectively configured to contact the received part, and wherein the plurality of actuatable testing features and the part partially define a closed volume adjacent the part.

2. The reconfigurable leak testing system of claim 1, wherein the leak testing station includes an actuator, and a fixture interface coupled with the actuator, the fixture interface including a plurality of interlocks configured to selectively couple with the upper fixture of the fixture cartridge; and the actuator configured to selectively raise and lower the fixture interface.

3. The reconfigurable leak testing system of claim 2, wherein the fixture interface further includes a connection panel configured to couple with the upper fixture, the connection panel including an electrical connector and a fluid connector; and
wherein the electrical connector provides an electrical connection between the leak testing station and the fixture cartridge, and wherein the fluid connector provides a pneumatic or hydraulic fluid connection between the leak testing station and the fixture cartridge.

4. The reconfigurable leak testing system of claim 3, further comprising a controller configured to control the actuation of the plurality of testing features.

5. The reconfigurable leak testing system of claim 4, wherein the controller is further configured to pressurize the closed volume by providing a pressurized fluid to the volume.

6. The reconfigurable leak testing system of claim 5, wherein the controller is configured to detect a leak in the volume by monitoring the pressure of the pressurized volume and detecting any pressure deviations from an expected pressure.

7. The reconfigurable leak testing system of claim 5, wherein the controller is configured to detect a leak in the volume by monitoring the total mass-flow of the pressurized fluid provided to the volume, and by comparing the monitored mass-flow to an expected total mass-flow.

8. The reconfigurable leak testing system of claim 1, further comprising an automated conveyor system configured to controllably translate the fixture cartridge between the off-shuttle and the leak testing station.

9. The leak testing system of claim 1, wherein the plurality of actuatable testing features include an extendable seal or extendable clamp.

10. A method of leak testing a part using a reconfigurable leak testing system comprising:
   selecting a fixture cartridge to receive the part, the fixture cartridge including a separatable upper fixture and lower fixture;
   loading the fixture cartridge into a leak testing station;
   receiving the part between the upper and lower fixtures;
   establishing a closed volume on one side of the part;
   pressurizing the closed volume using a pressurized fluid; and
   monitoring the pressurized fluid to detect fluid leakage.

11. The method of claim 10, wherein loading the fixture cartridge into the leak testing station includes translating the fixture cartridge from an off-shuttle to the leak testing station; and
   coupling a fixture interface of the leak testing station to the upper fixture of the fixture cartridge.

12. The method of claim 11, wherein coupling a fixture interface to the upper fixture includes selectively coupling a plurality of interlocks on the fixture interface to respective connection elements on the upper fixture.

13. The method of claim 11, wherein translating the fixture cartridge from an off-shuttle to the leak testing station includes controllably translating the fixture cartridge using an automatic conveyor system at the direction of a controller.

14. The method of claim 11, further comprising testing for the existence of a fluid leak between the fixture interface and the upper fixture.

15. The method of claim 10, wherein receiving the part between the upper and lower fixtures includes separating the upper fixture from the lower fixture, and receiving the part on the lower fixture.

16. The method of claim 15, wherein establishing a closed volume on one side of the part includes clamping the part to the lower fixture, and sealing an opening in the part.

17. The method of claim 16, wherein sealing an opening in the part includes contacting the part with a selectively extendable plunger disposed on the upper fixture.

18. The method of claim 10, wherein monitoring the pressurized fluid to detect fluid leakage includes monitoring the pressure of the pressurized volume; comparing the monitored pressure to an expected pressure; and indicating fluid leakage if the monitored pressure deviates from the expected pressure.

19. The method of claim 10, wherein monitoring the pressurized fluid to detect fluid leakage includes monitoring the total mass-flow of the pressurized fluid into the closed volume; comparing the monitored total mass-flow to an expected total mass-flow; and indicating fluid leakage if the monitored total mass-flow deviates from the expected total mass-flow.

20. A method of leak testing a part comprising:
   selecting a fixture cartridge to receive the part, the fixture cartridge including a separatable upper fixture and lower fixture;
   loading the fixture cartridge into a leak testing station by controllably translating the fixture cartridge from an off-shuttle to the leak testing station using an automatic conveyor system; and coupling a fixture interface of the leak testing station to the upper fixture of the fixture cartridge;
   receiving the part between the upper and lower fixtures by separating the upper fixture from the lower fixture, and receiving the part on the lower fixture;
   establishing a closed volume on one side of the part by clamping the part to the lower fixture, and sealing an opening in the part using an extendable plunger disposed on the upper fixture;
   pressurizing the closed volume using a pressurized fluid; and
   monitoring the pressurized fluid to detect fluid leakage by comparing a sensed parameter of the monitored pressurized fluid to an expected parameter.

* * * * *